United States Patent
Park et al.

(10) Patent No.: US 10,207,326 B2
(45) Date of Patent: Feb. 19, 2019

(54) APPARATUS FOR FABRICATING THREE-DIMENSIONAL OBJECT

(71) Applicants: Soyoung Park, Kanagawa (JP); Shinichi Kakuda, Kanagawa (JP); Shozo Sakura, Kanagawa (JP)

(72) Inventors: Soyoung Park, Kanagawa (JP); Shinichi Kakuda, Kanagawa (JP); Shozo Sakura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 403 days.

(21) Appl. No.: 14/728,025

(22) Filed: Jun. 2, 2015

(65) Prior Publication Data

US 2015/0343533 A1 Dec. 3, 2015

(30) Foreign Application Priority Data

Jun. 2, 2014 (JP) .................. 2014-113847

(51) Int. Cl.
*B22F 3/18* (2006.01)
*B29C 64/20* (2017.01)
(Continued)

(52) U.S. Cl.
CPC ................ *B22F 3/18* (2013.01); *B22F 3/008* (2013.01); *B28B 1/001* (2013.01); *B28B 7/465* (2013.01);
(Continued)

(58) Field of Classification Search
CPC .......... B22F 3/18; B22F 3/008; B22F 3/1055; B22F 2003/1056; B22F 2998/10; B28B 1/001; B28B 7/465; B29C 64/20; B29C 67/0085; B29C 35/08; B33Y 30/00; B29K 2105/251; B05C 11/04; B05C 11/00; B05D 3/12

USPC .............................. 425/78; 264/401; 118/679
See application file for complete search history.

(56) References Cited

U.S. PATENT DOCUMENTS 4,961,901 A   10/1990   Wüllenweber et al.
5,114,326 A   5/1992    Wüllenweber et al.
(Continued)

FOREIGN PATENT DOCUMENTS

CN   103561891 A    5/2014
EP   0339728 A1    11/1989
(Continued)

OTHER PUBLICATIONS

JP 2008291318A—Machine Translation (Year: 2008).*
(Continued)

*Primary Examiner* — Matthew J Daniels
*Assistant Examiner* — Yunju Kim
(74) *Attorney, Agent, or Firm* — Cooper & Dunham LLP

(57) ABSTRACT

An apparatus for fabricating a three-dimensional object includes a fabrication stage and a flattener. A fabrication layer in which powder particles are bound together is formed layer-by-layer on the fabrication stage. The flattener relatively moves in a moving direction along a stage surface of the fabrication stage and flattens a surface of powder on the fabrication stage to form a powder layer. The fabrication stage and the flattener are arranged to be relatively movable in a height direction. In formation of the powder layer on the fabrication layer formed on the fabrication stage, the apparatus performs an operation to increase a distance between the flattener and the fabrication stage in the height direction when the flattener moves to a position near an edge of the fabrication layer in the moving direction.

8 Claims, 13 Drawing Sheets

(51) Int. Cl.
  *B22F 3/00* (2006.01)
  *B28B 7/46* (2006.01)
  *B33Y 30/00* (2015.01)
  *B28B 1/00* (2006.01)
  *B22F 1/00* (2006.01)
  *B22F 3/10* (2006.01)
  *B22F 3/24* (2006.01)
  *B29K 105/00* (2006.01)

(52) U.S. Cl.
  CPC ............ *B29C 64/20* (2017.08); *B33Y 30/00* (2014.12); *B22F 2998/10* (2013.01); *B29K 2105/251* (2013.01)

(56) References Cited

U.S. PATENT DOCUMENTS

| | | | |
|---|---|---|---|
| 6,764,636 B1 * | 7/2004 | Allanic | B29C 41/12 118/100 |
| 2001/0050448 A1 | 12/2001 | Kubo et al. | |
| 2007/0074659 A1 * | 4/2007 | Wahlstrom | B33Y 40/00 118/679 |
| 2014/0147328 A1 | 5/2014 | Abe et al. | |

FOREIGN PATENT DOCUMENTS

| | | |
|---|---|---|
| JP | 9-272153 | 10/1997 |
| JP | 2003-053847 | 2/2003 |
| JP | 2003-508246 | 3/2003 |
| JP | 2005-059324 | 3/2005 |
| JP | 2008-291318 | 12/2008 |
| JP | 2010-208069 | 9/2010 |
| JP | 2012-166487 | 9/2012 |
| JP | 2013-075391 | 4/2013 |
| WO | WO00/051809 A1 | 9/2000 |

OTHER PUBLICATIONS

JP 2012166487A—Machine Translation (Year: 2012).*
Chinese official action dated Mar. 2, 2017 in corresponding Chinese patent application No. 201510296454.2.

* cited by examiner

APPARATUS FOR FABRICATING THREE-DIMENSIONAL OBJECT

CROSS-REFERENCE TO RELATED APPLICATIONS

This patent application is based on and claims priority pursuant to 35 U.S.C. § 119(a) to Japanese Patent Application No. 2014-113847, filed on Jun. 2, 2014 in the Japan Patent Office, the entire disclosure of which is hereby incorporated by reference herein.

BACKGROUND

Technical Field

Aspects of the present disclosure relate to an apparatus for fabricating a three-dimensional object.

Description of the Related Art

As a solid (three-dimensional) fabricating apparatus to fabricate a solid (three-dimensional) object, for example, a lamination fabrication method is known. In this method, for example, a flattened powder layer is formed on a fabrication stage, and fabrication liquid is discharged from a head to the powder layer on the fabrication stage to form a thin fabrication layer in which powder particles are bound together. A step of forming another powder layer on the fabrication layer to reform the fabrication layer is repeated to laminate the fabrication layers, thus producing a three-dimensional object.

When a powder layer is formed by supplying powder onto a fabrication layer and flattening the powder with a flattener, such as a recoater roller, movement (drag or expansion) of the fabrication layer may reduce the lamination accuracy and the quality of the three-dimensional object.

SUMMARY

In at least one embodiment of the present disclosure, there is provided an apparatus for fabricating a three-dimensional object. The apparatus includes a fabrication stage and a flattener. A fabrication layer in which powder particles are bound together is formed layer-by-layer on the fabrication stage. The flattener relatively moves in a moving direction along a stage surface of the fabrication stage and flattens a surface of powder on the fabrication stage to form a powder layer. The fabrication stage and the flattener are arranged to be relatively movable in a height direction. In formation of the powder layer on the fabrication layer formed on the fabrication stage, the apparatus performs an operation to increase a distance between the flattener and the fabrication stage in the height direction when the flattener moves to a position near an edge of the fabrication layer in the moving direction.

In at least one embodiment of the present disclosure, there is provided an apparatus for fabricating a three-dimensional object. The apparatus includes a fabrication stage and a flattener. A fabrication layer in which powder particles are bound together is formed layer-by-layer on the fabrication stage. The flattener relatively moves in a moving direction along a stage surface of the fabrication stage and flattens a surface of powder on the fabrication stage to form a powder layer. The flattener includes a first flattening roller and a second flattening roller. In formation of the powder layer, the first flattening roller that arrives at the powder earlier than the second flattening roller is placed at a position higher than the second flattening roller that arrives at the powder later than the first flattening roller. In formation of the powder layer, the first flattening roller rotates forward in a relative moving direction with respect to the fabrication stage and the second flattening roller rotates in reverse in a relative moving direction with respect to the fabrication stage.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
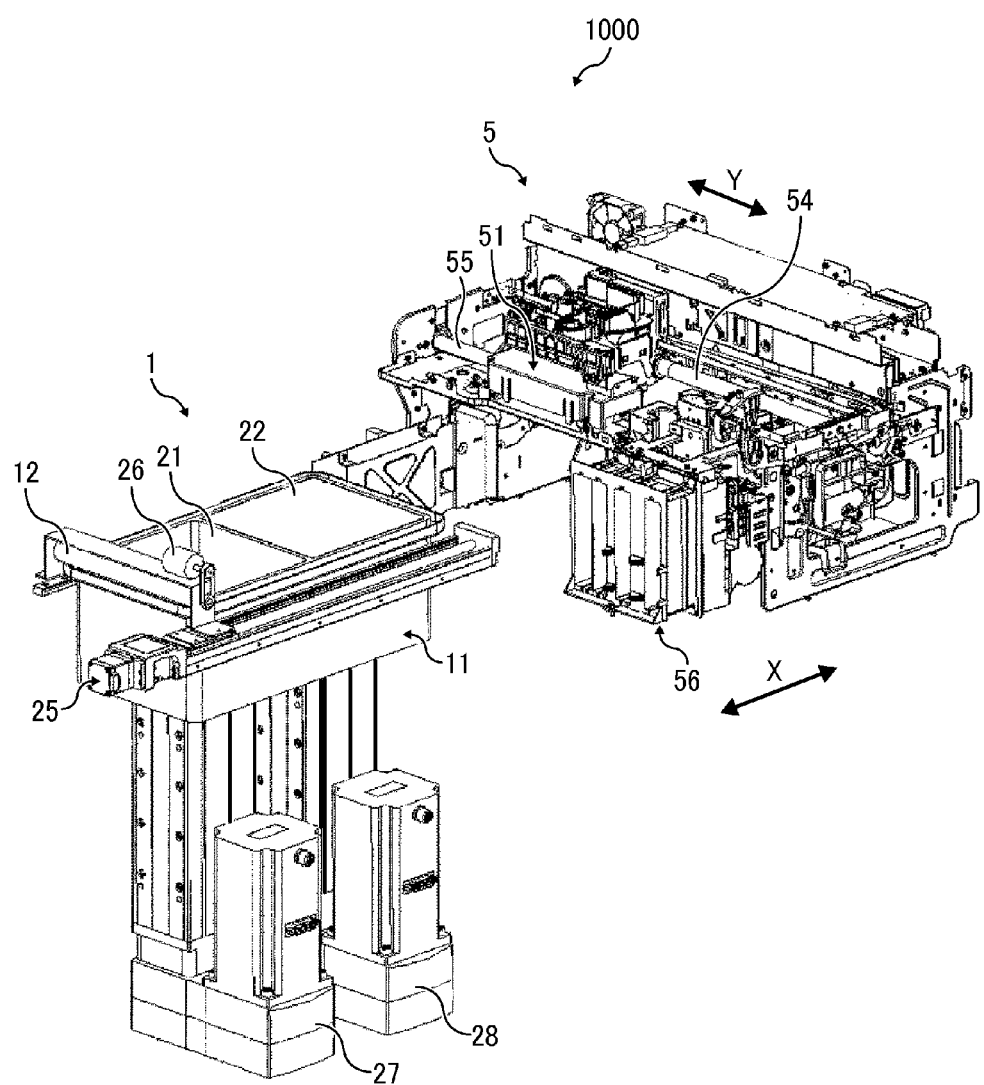
FIG. 1 is a partial perspective view of an example of a three-dimensional fabricating apparatus according to the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Figure 2:
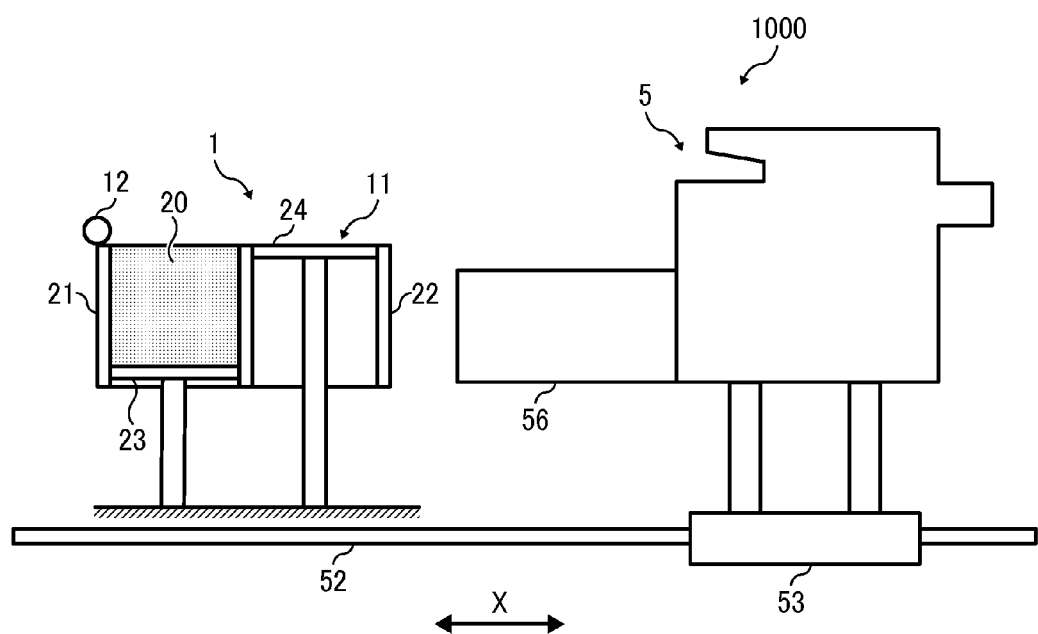
FIG. 2 is a schematic side view of the three-dimensional fabricating apparatus of FIG. 1.

Hereinafter, embodiments of the present disclosure are described with reference to the attached drawings. First, an example of a three-dimensional fabricating apparatus according to this disclosure is described with reference to FIGS. 1 and 2. FIG. 1 is a partial perspective view of a three-dimensional fabricating apparatus 1000 according to an embodiment of this disclosure. FIG. 2 is a schematic side view of the three-dimensional fabricating apparatus 1000.

The three-dimensional fabricating apparatus 1000 includes a fabrication section 1 and a fabrication unit 5. The fabrication section 1 forms a fabrication layer in which powder particles are bound together. The fabrication unit 5 fabricates a three-dimensional object by discharging fabrication.

The fabrication section 1 includes a powder chamber 11 and a flattening roller (also referred to as recoater roller) 12 serving as a flattener.

The powder chamber 11 includes a supply chamber 21 to supply powder 20 and a fabrication chamber 22 to fabricate an object. A bottom portion of the supply chamber 21 serves as a supply stage 23 and is movable upward and downward in a vertical direction (height direction). Similarly, a bottom portion of the fabrication chamber 22 serves as a fabrication stage 24 and is movable upward and downward in the vertical direction (height direction). A three-dimensional object is fabricated on the fabrication stage 24.

A motor 27 moves the supply stage 23 upward and downward. A motor 28 moves the fabrication stage 24 upward and downward.

The flattening roller 12 supplies the powder 20 supplied on the supply stage 23 of the supply chamber 21, to the fabrication chamber 22 and flattens the powder 20 to form a powder layer. A reciprocal moving assembly 25 reciprocally moves the flattening roller 12 along a direction indicated by arrow X in FIG. 2, and a motor 26 drives and rotates the flattening roller 12.

The fabrication unit 5 includes a discharge head unit 51 to discharge fabrication liquid to the powder layer on the fabrication stage 24. The fabrication unit 5 further includes a head cleaning assembly to clean the discharge head unit 51.

Figure 15:
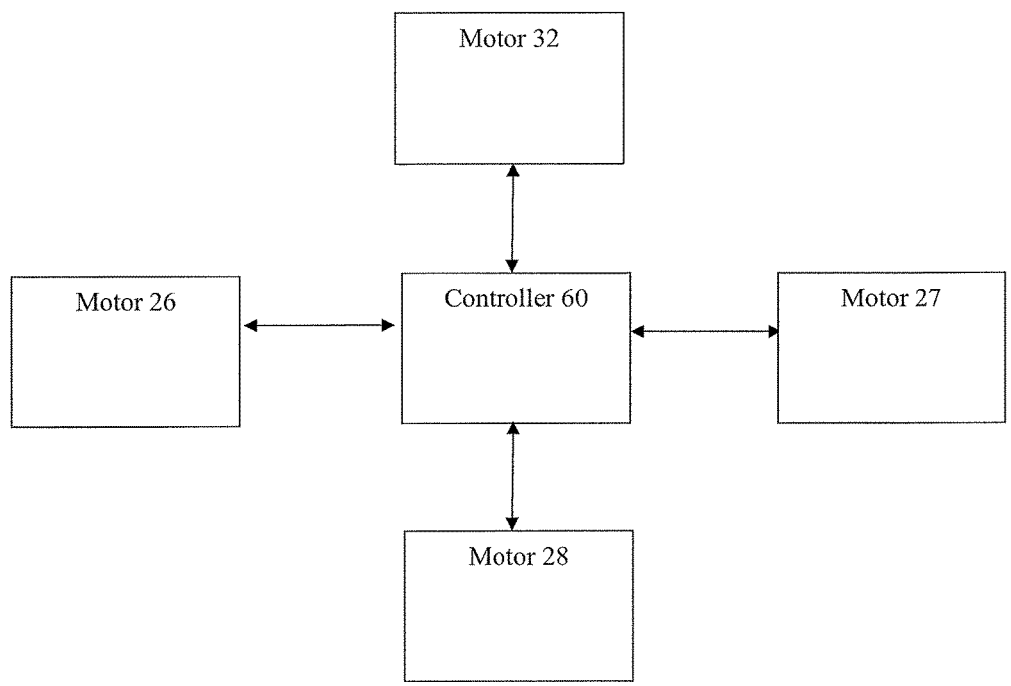
FIG. 15 illustrates a block diagram showing control of motors 26-28 and 32 by a controller, in an example of a three-dimensional fabricating apparatus.

The fabrication unit 5 includes a slider 53 movably supported by a guide 52, and the entire fabrication unit 5 is reciprocally movable along the direction indicated by arrow X with, e.g., a motor 32 (FIG. 15).

The discharge head unit 51 is supported by guides 54 and 55 so as to be reciprocally movable along a direction indicated by arrow Y.

The discharge head unit 51 includes, e.g., a head to discharge a cyan fabrication liquid, a head to discharge a magenta fabrication liquid, a head to discharge an yellow fabrication liquid, a head to discharge a black fabrication liquid, and a head to discharge a colorless fabrication liquid. A tank mount 56 mounts plural tanks containing cyan fabrication liquid, magenta fabrication liquid, yellow fabrication liquid, black fabrication liquid, and colorless fabrication liquid.

Figure 3:
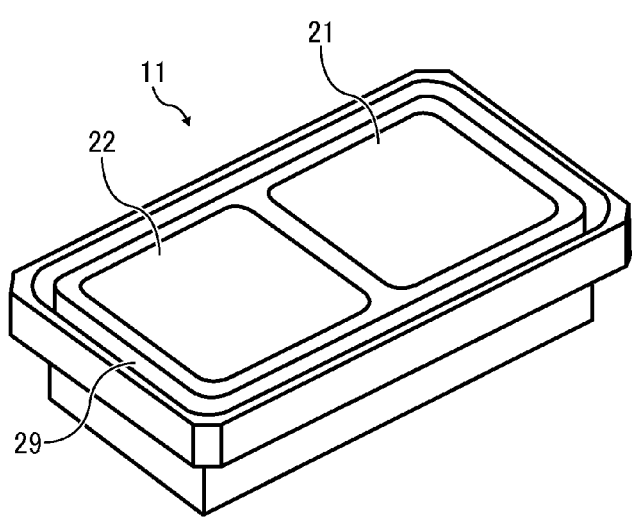
FIG. 3 is a perspective view of an example of a powder chamber of a fabrication section.
Figure 4:
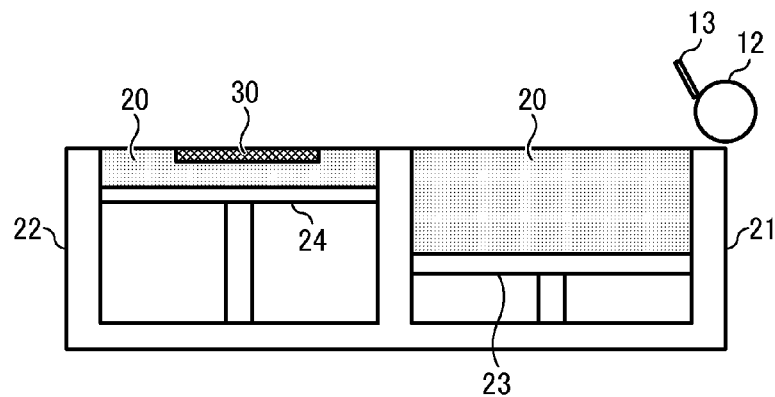
FIG. 4 is a schematic cross-sectional view of the fabrication section of FIG. 3.

Next, an example of the fabrication unit is described with reference to FIG. 3 and FIG. 4. FIG. 3 is a perspective view of an example of the powder chamber. FIG. 4 is a schematic cross-sectional view of an example of the fabrication unit. FIGS. 3 and 4 correspond to back side views of the three-dimensional fabricating apparatus 1000 of FIG. 1.

The powder chamber 11 has a box shape and includes two chambers, the supply chamber 21 and the fabrication chamber 22, each of which is open at the upper side thereof. The supply stage 23 and the fabrication stage 24 are held inside the supply chamber 21 and the fabrication chamber 22, respectively, so as to be movable upward and downward.

Lateral faces of the supply stage 23 are disposed to contact inner lateral faces of the supply chamber 21. Lateral faces of the fabrication stage 24 are disposed to contact inner lateral faces of the fabrication chamber 22. The upper faces of the supply stage 23 and the fabrication stage 24 are held horizontally.

As illustrated in FIG. 3, a powder falling groove 29 is disposed at the periphery of the powder chamber 11 and has a recessed shape with the upper side thereof being open. Surplus powder 20 collected with the flattening roller 12 in formation of a powder layer falls to the powder falling groove 29. Surplus powder 20 having fallen to the powder falling groove 29 is returned to a powder supply section that supplies powder to the supply chamber 21.

The powder supply section has, e.g., a tank shape and is disposed above the supply chamber 21. In an initializing operation of fabrication or when the amount of powder in the supply chamber 21 decreases, powder in the tank is supplied to the supply chamber 21. Examples of a powder transporting method for supplying powder include a screw conveyor method utilizing a screw and an air transport method utilizing air.

The flattening roller 12 transfers and supplies powder 20 from the supply chamber 21 to the fabrication chamber 22 and forms a desired thickness of powder layer. The flattening roller 12 is a bar longer than an inside dimension of the fabrication chamber 22 and the supply chamber 21 (that is, a width of a portion to which powder is supplied or stored). The reciprocal moving assembly 25 reciprocally moves the flattening roller 12 in a direction along the stage surface (the direction indicated by arrow X parallel to the stage surface).

While being rotated by a motor 26, the flattening roller 12 horizontally moves to pass an area above the supply chamber 21 and the fabrication chamber 22 from the outside of the supply chamber 21, thus transferring and supplying the powder 20 onto the fabrication chamber 22.

Next, a flow of fabrication is described with reference to FIGS. 5A to 5E. FIGS. 5A through 5E are schematic cross-sectional views of fabrication steps of the fabrication section.

As illustrated in FIG. 4, for example, a first fabrication layer 30 is formed on the fabrication stage 24 of the fabrication chamber 22.

Figure 5A:
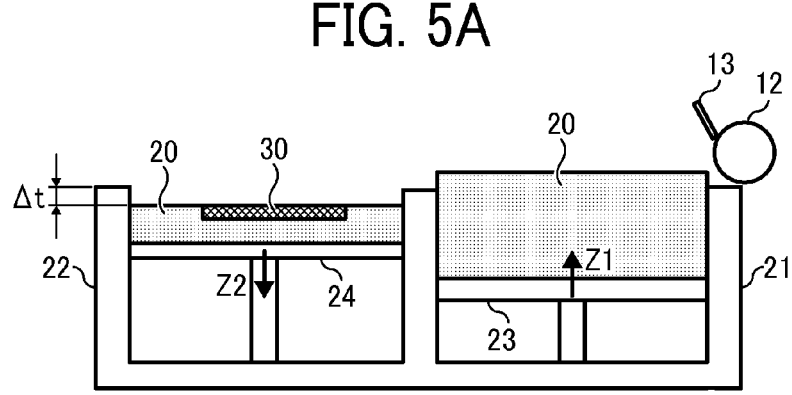
FIGS. 5A through 5E are schematic cross-sectional views of fabrication steps of the fabrication section.

When a second fabrication layer 30 is formed on the first fabrication layer 30, as illustrated in FIG. 5A, the supply stage 23 of the supply chamber 21 moves upward in a direction indicated by arrow Z1, and the fabrication stage 24 of the fabrication chamber 22 moves downward in a direction indicated by arrow Z2.

At this time, a downward movement distance of the fabrication stage 24 is set so that a distance between a surface of a powder layer of the fabrication chamber 22 and a lower portion (lower tangenital portion) of the flattening roller 12 is Δt. The distance Δt corresponds to the thickness of a fabrication layer to be formed next. The distance Δt is preferably about 50 μm to about 200 μm, and for example, is set to about 100 μm.

Figure 5B:
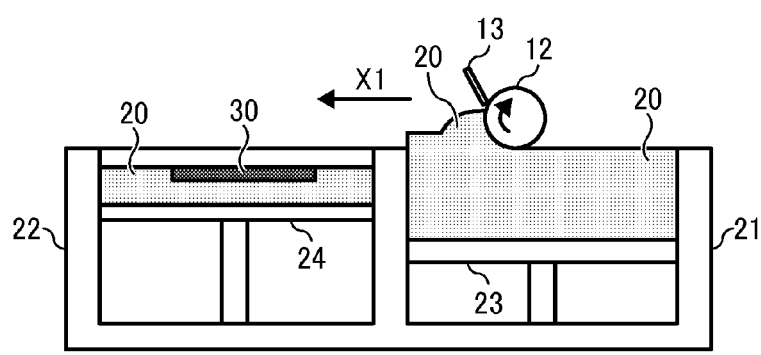

Next, as illustrated in FIG. 5B, by rotating and moving the flattening roller 12 toward the fabrication chamber 22, powder 20 upper than the level of a top face of the supply chamber 21 is transferred and supplied to the fabrication chamber 22.

Figure 5C:
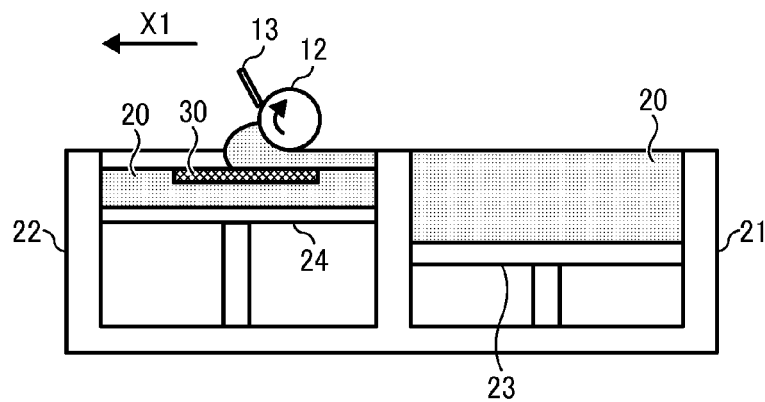
Figure 5D:
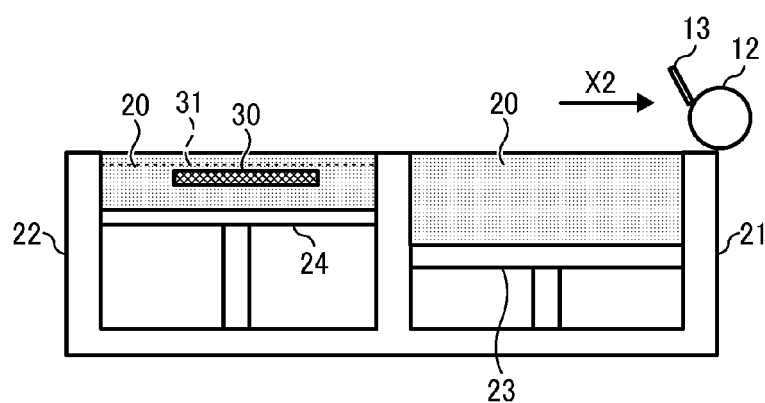

As illustrated in FIG. 5C, the flattening roller 12 is moved in parallel to the stage surface of the fabrication stage 24 of the fabrication chamber 22. As illustrated in FIG. 5D, a powder layer 31 having a thickness of Δt is formed on the fabrication layer 30 of the fabrication stage 24. After the powder layer is formed, the flattening roller 12 is moved in a direction indicated by arrow X2 and returned to an initial position.

Here, the flattening roller 12 is movable while maintaining a constant distance between the fabrication chamber 22 and the level of the top face of the supply chamber 21. Such a configuration allows formation of an uniform thickness of the powder layer 31 on the fabrication chamber 22 or the fabrication layer 30 already formed while transporting the powder 20 to an area above the fabrication chamber 22 with the flattening roller 12.

For transferring the powder 20, the flattening roller 12 preferably rotates in a counter direction (reverse direction) relative to the horizontal moving direction. However, to increase the density of powder material, the flattening roller 12 can be rotated in a direction (forward direction) opposite the counter direction. Alternatively, after horizontally moving while rotating in the counter direction, the flattening roller 12 may be horizontally moved while rotating the direction opposite the counter direction, thus obtaining effects of transfer of powder and increase of the density of powder material.

In addition, a cleaning blade 13 is disposed to remove powder 20 adhering to the flattening roller 12.

The flattener is not only a roller and, for example, a square blade can be used. Selection or driving conditions of the flattener can be changed according to properties of powder (e.g., the degree of aggregation or fluidity of powder particles) or preservation state of powder (e.g., preservation under highly humid environment).

Figure 5E:
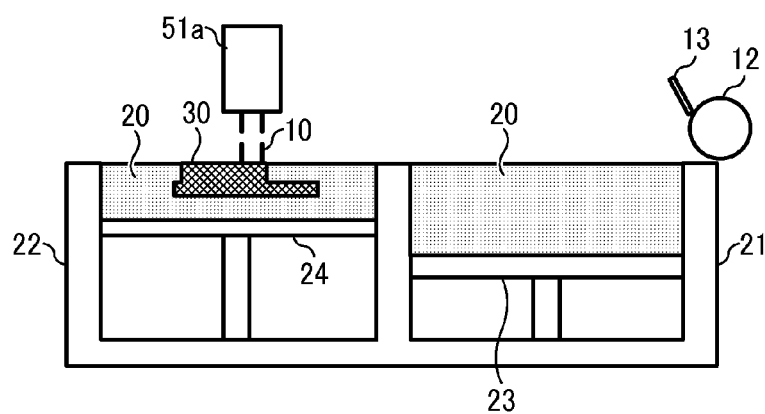

Then, as illustrated in FIG. 5E, fabrication liquid 10 is discharged from a head 51a of the discharge head unit 51 to form multilayers of the fabrication layer 30 of the thickness of time Δt.

The fabrication layer 30, for example, when the fabrication liquid 10 discharged from the head 51a is mixed with the powder 20, adhesives contained in the powder 20 dissolve and bond together. Thus, particles of the powder 20 bind together to form the fabrication layer 30.

Next, the above-described powder supply and flattening steps and the step of discharging the fabrication liquid with the head are repeated to form a new fabrication layer. At this time, a new fabrication layer and a fabrication layer below the new fabrication layer are united to form part of a three-dimensional fabrication object.

Then, the powder supply and flattening steps and the step of discharging the fabrication liquid with the head are repeated a required number of times to finish the three-dimensional fabrication object (solid fabrication object).

Next, a description is given of a powder material (powder) for three-dimensional fabrication or a fabrication liquid used in a three-dimensional fabricating apparatus according to an embodiment of this disclosure.

The powder material for three-dimensional fabrication includes a base material and a water-soluble organic material that dissolves by action of cross-linker containing water serving as fabrication liquid and turns to be cross-linkable. The base material is coated with the water-soluble organic material at an average thickness of 5 nm to 500 nm.

For the powder material for three-dimensional fabrication, the water-soluble organic material coating the base material dissolves by action of cross-linker containing water and turns to be cross-linkable. When cross-linker containing water is applied to the water-soluble organic material, the water-soluble organic material dissolves and cross-link by action of cross-linkers contained in the cross-linker containing water.

Thus, a thin layer (powder layer) is formed with the powder material for three-dimensional fabrication. When the cross-linker containing water is discharged as the fabrication liquid 10 onto the powder layer, the dissolved water-soluble organic material cross-links in the powder layer. As a result, the powder layer is joined and hardened, thus forming the fabrication layer 30.

At this time, the coverage of the water-soluble organic material coating the base material is 5 nm to 500 nm in average thickness. When the water-soluble organic material dissolves, only a minimum required amount of the water-soluble organic material is present around the base material. The minimum required amount of water-soluble organic material cross-links and forms a three-dimensional network. Accordingly, the powder layer is hardened at a good dimensional accuracy and strength.

Repeating the operation allows a complex three-dimensional object to be simply and effectively formed at a good dimensional accuracy without losing the shape before sintering.

The three-dimensional object thus obtained has a good hardness. Even if the three-dimensional object is held by hand or an excess powder material for three-dimensional fabrication is removed by air blowing, the three-dimensional object is free from losing the shape and then can be easily sintered.

In the three-dimensional object formed as described above, the base material is present densely (at a relatively high packing density. A quite small amount of the water-soluble organic material is present between the base materials. Then, when a molded object (three-dimensional object) is obtained by sintering and so on, the molded object is free from unnecessary voids and a good-appearance molded object (three-dimensional object) can be obtained.

Base material—The base material is not limited to a specific material as long as the material has a shape of powder or particle. Any powder or particulate material can be selected as the base material according to the purpose. Examples of the material include metal, ceramic, carbon, polymer, wood, and biocompatible material. From a viewpoint of obtaining a relatively high strength of three-dimensional object, for example, metal or ceramic which can be finally sintered is preferable.

Preferable examples of metal include stainless steel (SUS), iron, copper, titan, and silver. An example of SUS is SUS316L.

Examples of ceramic include metal oxide, such as silica ($SiO_2$), alumina ($AL203$), zirconia ($ZrO_2$), and titania ($TiO_2$).

Examples of carbon include graphite, graphene, carbon nanotube, carbon nanohorn, and fullerene.

An example of polymer is publicly-known water-insoluble resin.

Examples of wood include woodchip and cellulose.

Examples of biocompatible material includes polylactic acid and calcium phosphate.

Of such materials, one material can be solely used or two or more types of materials can be used together.

In at least one embodiment of this disclosure, commercially available particles or powder formed of such materials can be used as the base material. Examples of commercial products include SUS316L (PSS316L made by SANYO SPECIAL STEEL Co., Ltd), $SiO_2$ Ecserica SE-15 made by Tokuyama Corporation), $ZrO_2$ (TZ-B53 made by Tohsoh Corporation).

To enhance the compatibility with water-soluble organic material, known surface (reforming) treatment may be performed on the base material.

Water-soluble organic material—The water-soluble organic material is not limited to a specific material as long as the material dissolves in water and is cross-linkable by action of cross-linker. In other words, if it is water-soluble and water-linkable by action of cross-linker, any material can be selected according to the purpose.

Here, the water solubility of water-soluble organic material means that, when a water-soluble organic material of 1 g is mixed into water 100 g at 30° C. and stirred, not less than 90 mass percentage of the water-soluble organic material dissolves in the water.

As the water-soluble organic material, the viscosity of four mass percentage (w/w %) solution at 20° C. is preferably not greater than 40 mP·s, more preferably 1 to 35 Pa·s, particularly more 5 to 30 Pa·s.

When the viscosity of the water-soluble organic material is greater than 40 mP·s, the hardness of a hardened material (three-dimensional object or hardened material for sintering) of the powder material (powder layer) for three-dimensional object formed by applying cross-linker containing water to the powder material for three-dimensional fabrication may be insufficient. As a result, in post-treatment, such as sintering, and handling, the hardened material may lose the shape. In addition, the hardened material may be insufficient in dimensional accuracy.

The viscosity of the water-soluble organic material can be measured in accordance with, for example, JISK117.

Cross-linker containing water—The cross-linker containing water serving as fabrication liquid is not limited to any specific liquid as long as the liquid contains cross linker in aqueous medium, and any suitable liquid is selectable according to the purpose. The cross-linker containing water can include any other suitable component as needed in addition to the aqueous medium and the cross-linker.

As such other component, any suitable component is selectable in consideration of conditions, such as the type of an applicator of the cross-linker containing water or the frequency and amount of use. For example, when the cross-linker containing water is applied according to a liquid discharge method, a component can be selected in consideration with influences of clogging to nozzles of the liquid discharge head.

Examples of the aqueous medium include alcohol, ethanol, ether, ketone, and preferably water. The aqueous medium may be water containing a slight amount of other component, such as alcohol, than water.

Using the above-described powder material for three-dimensional object and cross-linker containing water serving as fabrication liquid reduces clogging of nozzles and enhances the durability of the liquid discharge head as compared to a configuration in which the liquid discharge head discharges binder to attach powder (base material).

Figure 6:
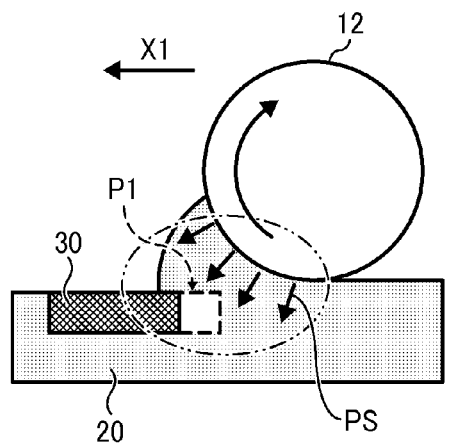
FIG. 6 is an illustration of movement (shift) of a fabrication layer when a powder layer is formed.

Next, an example of displacement of a fabrication layer during formation of a powder layer is described with reference to FIG. 6. FIG. 6 is an illustration of an example of displacement of a fabrication layer.

Powder 20 transferred and supplied to the fabrication chamber 22 with the flattening roller 12 is flattened with the flattening roller 12. At this time, if a fabrication layer 30 already fabricated is present in the powder 20, pressure PS of the flattening roller 12 is applied to the powder 20 and the fabrication layer 30 might be displaced from a proper position (formed position P1) indicated by a broken line to a position indicated by a solid line as illustrated in FIG. 6.

Such movement of the fabrication layer 30 would reduce the accuracy in shape of the three-dimensional object.

Next, a first embodiment of this disclosure is described with reference to FIGS. 7A to 7D. FIGS. 7A to 7D are illustrations of steps of forming a powder layer in the first embodiment of this disclosure.

In this embodiment, when the powder 20 is transferred and supplied from the supply chamber 21 to the fabrication chamber 22 and the fabrication layer 30 having been already fabricated is present in a lower layer in the step of forming the powder layer (the powder-layer formation step), the following operation is performed.

In this embodiment, the flattening roller 12 is disposed to be movable in the height direction.

Figure 7A:
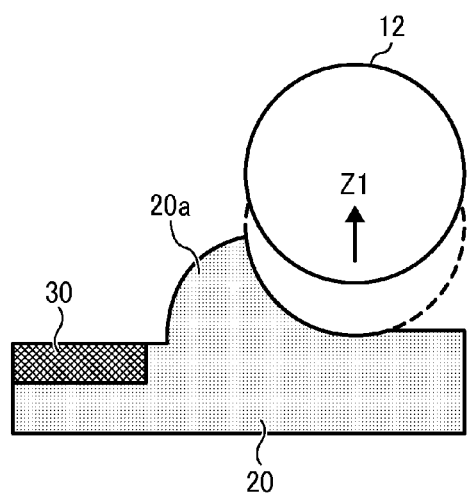
FIGS. 7A through 7D are illustrations of steps of forming a powder layer in a first embodiment of this disclosure.
Figure 7B:
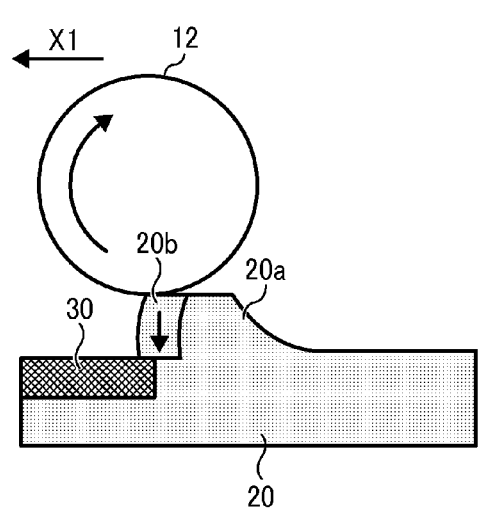

As illustrated in FIG. 7A, the flattening roller 12 transfers and supplies the powder 20 to a position upstream from an edge (border) of the fabrication layer 30 (in a moving direction of indicated by arrow X1 in FIG. 7B). In such a case, the rotation speed and horizontal movement speed of the flattening roller 12 are preferably set to optimal conditions. The flattening roller 12 is stopped at a position (indicated by a broken line) upstream from the edge of the fabrication layer 30.

The flattening roller 12 is moved upward in a direction indicated by arrow Z1 and placed at a position indicated by a solid line in FIG. 7A to change (extend) a distance (interval) between the flattening roller 12 and the fabrication stage 24 in the height direction. As a result, a gap (having a thickness of Δt) increases between the flattening roller 12 and a surface of the existing powder layer (the powder layer in which a fabrication layer 30 is already formed).

Next, as illustrated in FIG. 7B, at a position at which the flattening roller 12 is relatively moved upward with respect to the fabrication stage 24, the flattening roller 12 is rotated and horizontally moved in the direction indicated by arrow X1 again. Accordingly, an upper portion of an upheaval 20a of the powder 20 formed upstream from the fabrication layer 30 in the moving direction (indicated by X1) of the flattening roller 12 levels down, and a portion 20b of the powder 20 is supplied from a vertical direction onto the existing fabrication layer 30.

As described above, the gap is extended between the flattening roller 12 and the existing fabrication layer 30 (the powder layer in which a fabrication layer 30 is already formed), and the flattening roller 12 is moved in the horizontal direction. Thus, an upper portion of the upheaval 20a of the powder 20 transferred to a position upstream from the edge of the fabrication layer 30 and accumulated in a mountainous form is leveled down.

In other words, when another powder layer is formed on the fabrication layer 30 having been formed on the fabrication stage 24, the flattening roller 12 is moved to a position near an edge of the existing fabrication layer 30 and an operation (gap changing operation) is performed to extend the distance between the flattening roller 12 and the fabrication stage 24 in the height direction.

The gap changing operation to extend the distance between the flattening roller 12 and the fabrication stage 24 in the height direction includes an action to move the flattening roller 12 in a direction parallel to the surface of the fabrication stage 24 (a direction along the surface of the fabrication stage 24) with the flattening roller 12 placed at a changed position, to level down the upheaval 20a of the powder 20 formed upstream from the flattening roller 12 in the moving direction of the flattening roller 12 (the entire action is referred to as leveling step or leveling action).

Through the leveling action, the powder 20 is conveyed (layered) in the vertical direction at the edge of the fabrication layer 30, thus freeing the fabrication layer 30 from pressure generated by the horizontal movement of the flattening roller 12.

Thus, displacement (movement) of the fabrication layer 30 is prevented.

Figure 7C:
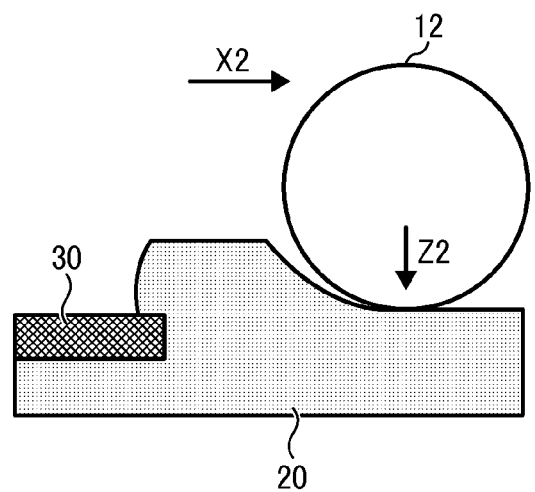

When a layer of the powder 20 is formed on the edge of the fabrication layer 30, as illustrated in FIG. 7C, the flattening roller 12 is horizontally moved toward the supply chamber 21 (in a direction opposite a direction in which the powder is transferred), and the flattening roller 12 is moved downward to return the gap to an original value.

Figure 7D:
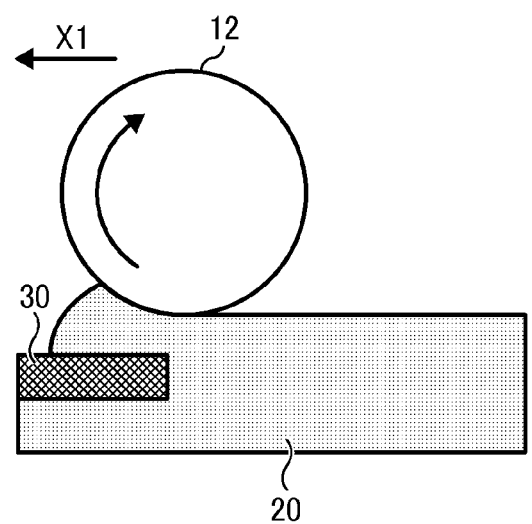

As illustrated in FIG. 7D, the flattening roller 12 is moved in the direction indicated by arrow X1 parallel to the stage surface of the fabrication stage 24 while being rotating the flattening roller 12 again.

The leveling step of relatively moving the flattening roller 12 to extend the distance (gap) in the height direction and horizontally moving the flattening roller 12 is performed once or plural times. When the thickness Δt of the powder layer is relatively large, the leveling step is preferably performed plural times to stepwisely level down the upper portion of the upheaval 20a.

Next, a second embodiment of the present disclosure is described with reference to FIGS. 8A to 8D. FIGS. 8A to 8D are illustrations of steps of forming a powder layer in the second embodiment of this disclosure.

In this embodiment, when powder 20 is transferred and supplied from a supply chamber 21 to a fabrication chamber 22 and a fabrication layer 30 having been already fabricated is present in a lower layer in the step of forming a powder layer (powder-layer formation step), the following operation is performed.

Figure 8A:
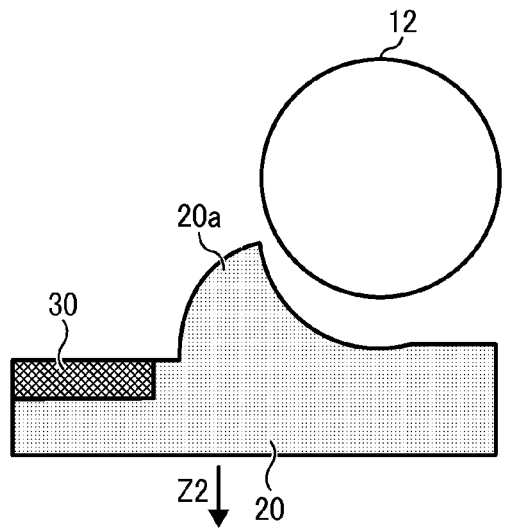
FIGS. 8A through 8D are illustrations of steps of forming a powder layer in a second embodiment of this disclosure.
Figure 8B:
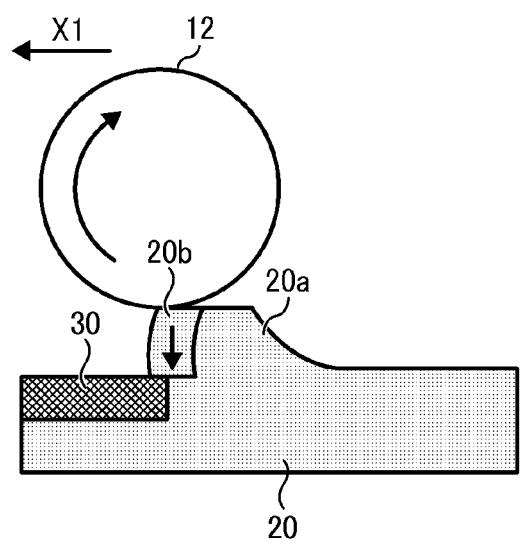
Figure 8C:
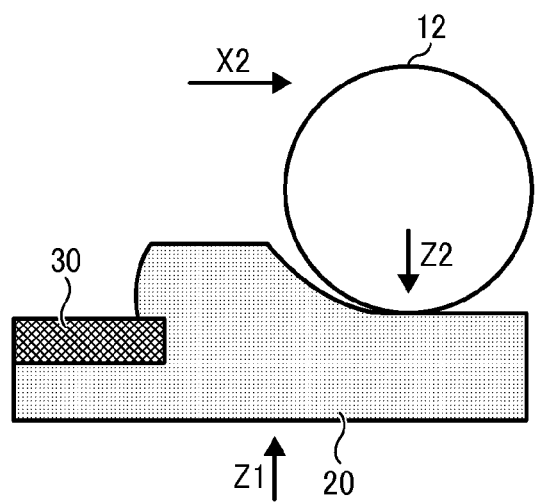
Figure 8D:
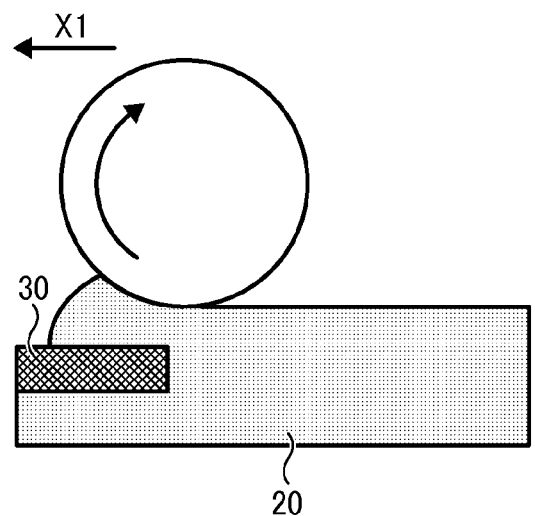

In this embodiment, when the distance between a flattening roller 12 and a fabrication stage 24 in the height direction is changed to extend a gap time Δt and a leveling step (leveling action) of leveling down an upheaval of the powder 20, as illustrated in FIG. 8A, the fabrication stage 24 is moved downward. When the gap is returned to an original value, as illustrated in FIG. 8C, the fabrication stage 24 is moved upward. Other actions are performed similarly to those of the first embodiment.

Similarly to the first embodiment, such a configuration prevents displacement of the fabrication layer in the powder-layer formation step and allows use of an elevation assembly of the fabrication stage 24, thus allows a simpler configuration than a configuration of moving a flattener, such as the flattening roller 12, upward and downward.

Next, a third embodiment of the present disclosure is described below.

In this embodiment, a sensor is provided to detect or measure, for example, the number of layers of the fabrication layer, the thickness of each layer, and the thickness of the entire fabrication layer. The number of layers of the fabrication layer, the thickness of each layer, and the thickness of the entire fabrication layer can be obtained from three-dimensional data for forming a three-dimensional object.

When at least one of the number of layers of the fabrication layer, the thickness of each layer, and the thickness of the entire fabrication layer is greater than a predetermined threshold value, a controller 60 (FIG. 15) reduces the number of times of leveling steps or controls the leveling step not to be performed.

In other words, when an already-formed fabrication layer is relatively thick in preforming the powder-layer formation step, the fabrication layer is unlikely to be displaced. Hence, the fabrication speed can be increased by reducing the number of times of leveling steps or not performing the leveling step.

Figure 9A:
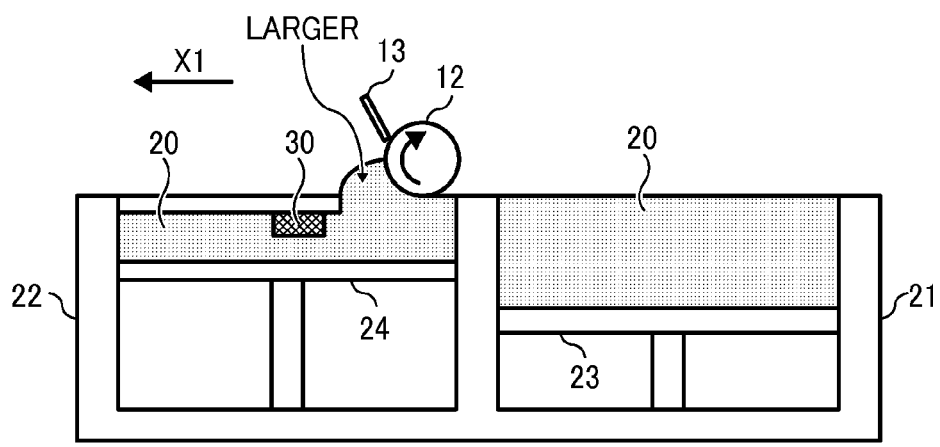
FIGS. 9A and 9B are illustrations of steps of forming a powder layer in a fourth embodiment of this disclosure.
Figure 9B:
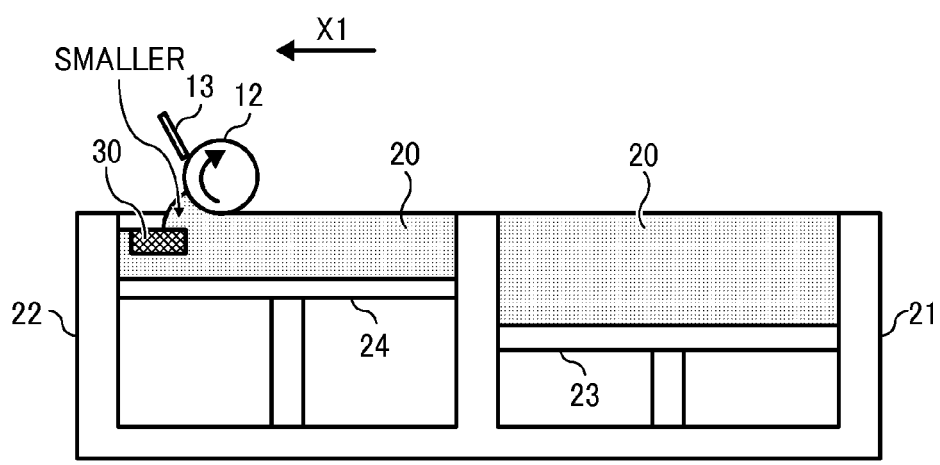

Next, a fourth embodiment of the present disclosure is described with reference to FIGS. 9A and 9B. FIGS. 9A and 9B are illustrations of a powder-layer formation step in the fourth embodiment.

In this embodiment, a sensor is provided to detect or measure the distance from an edge of a fabrication layer 30 to an edge of a fabrication stage 24, each of which is an upstream edge in a moving direction of a flattener (flattening roller 12)).

When the distance between the edge of the fabrication layer 30 and the edge of the fabrication stage 24 is greater than a predetermined threshold, the controller 60 reduces the number of times of leveling steps or control the leveling step not to be performed.

In other words, as illustrated in FIG. 9A, when the position of the fabrication layer 30 is near an inner lateral face of a fabrication chamber 22 (an edge of the fabrication stage 24 closer to a supply chamber 21) in the moving direction of the flattening roller 12 indicated by arrow X1, the amount of powder 20 transferred with the flattening roller 12 is relatively great. As a result, pressure is likely to be applied to the edge of the fabrication layer 30 and cause displacement of the fabrication layer 30.

By contrast, as illustrated in FIG. 9B, when the position of the fabrication layer 30 is far from the inner lateral face of the fabrication chamber 22 (the edge of the fabrication stage 24 closer to a supply chamber 21) in the moving direction of the flattening roller 12 indicated by arrow X1, the amount of the powder 20 transferred with the flattening roller 12 is relatively small. As a result, pressure to the edge of the fabrication layer 30 is relatively low and the fabrication layer 30 is unlikely to be displaced.

Hence, when the end portions of the fabrication layer is far from the edge of the fabrication stage (the distance is greater than the threshold value, the controller 60 reduces or does not perform the leveling step (action), thus increasing the fabrication speed.

Next, a fifth embodiment of the present disclosure is described below.

In the fifth embodiment, the number of times of leveling steps (actions) are changed according to the shape of a fabrication object (shape of an existing fabrication layer).

For example, when a fabrication object has a shape, such as an inverted cone shape in which the area of a lower portion is smaller than the area of an upper portion, the number of times of leveling steps (actions) is increased.

In other words, for the fabrication object having such a shape, when powder is transferred (laminated) in the vertical direction, pressure is applied to the fabrication layer. As a result, the fabrication layer might dig into a lower side, resulting in displacement in the vertical direction or damage, such as cracks, in the fabrication layer.

Hence, by increasing the number of times of leveling action, in this example, setting a smaller gap value to be extended at a single time, the amount of powder vertically laminated on the edge of the fabrication layer at a single time is reduced. Accordingly, pressure to the edge of the fabrication layer is reduced, thus preventing displacement of the fabrication layer in the vertical direction or damage to the fabrication layer.

Figure 10:
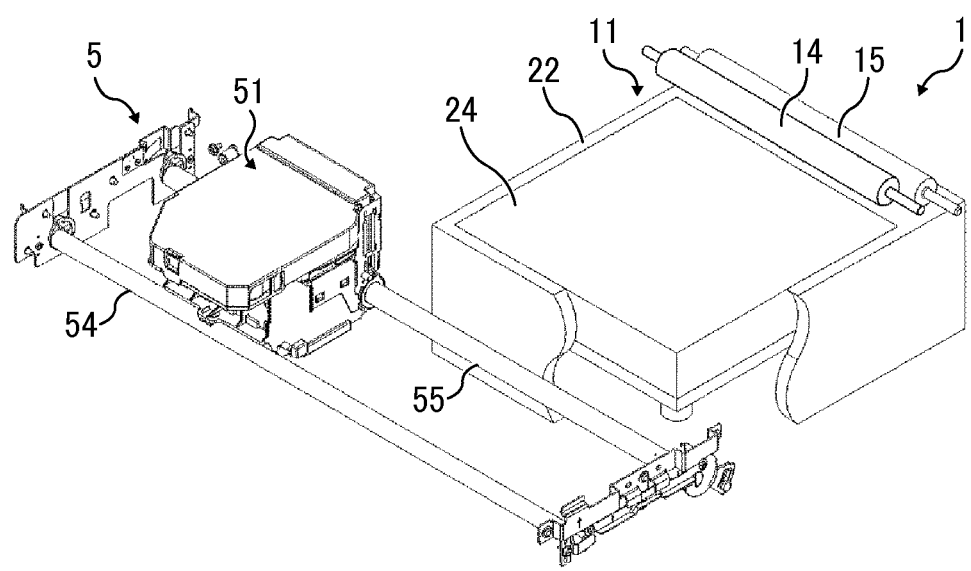
FIG. 10 is a perspective view of a three-dimensional fabricating apparatus according to a sixth embodiment of this disclosure.
Figure 11A:
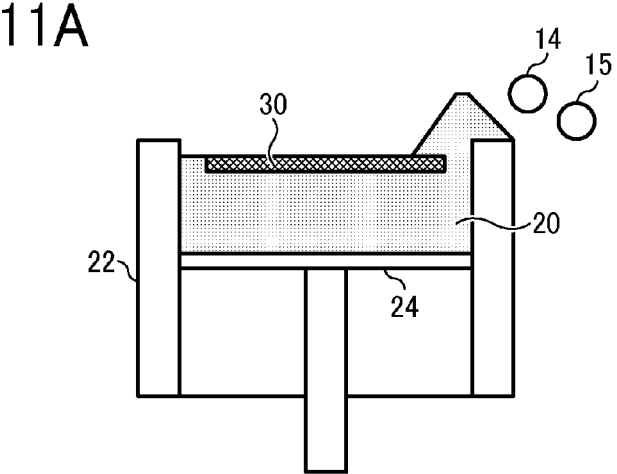
FIGS. 11A and 11B are illustrations of fabrication steps of the three-dimensional fabricating apparatus according to the sixth embodiment of this disclosure.
Figure 11B:
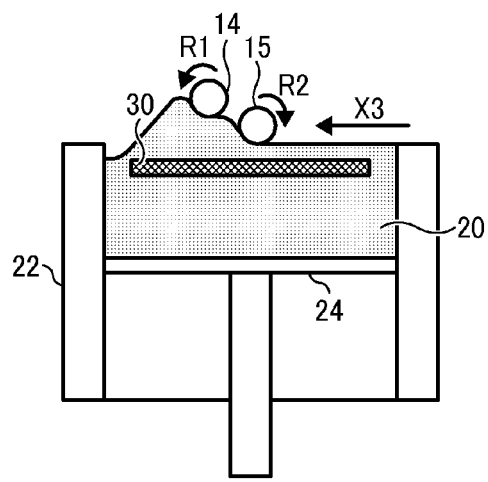

Next, a sixth embodiment of the present disclosure is described with reference to FIGS. 10, 11A, and 11B. FIG. 10 is a perspective view of a three-dimensional fabricating apparatus 1000 according to the sixth embodiment. FIGS. 11A and 11B are illustrations of fabrication steps of the three-dimensional fabricating apparatus 1000 according to the sixth embodiment.

The three-dimensional fabricating apparatus 1000 includes a fabrication chamber 22 serving as a powder chamber 11. The three-dimensional fabricating apparatus 1000 also includes two flattening rollers: a first recoater roller 14 and a second recoater roller 15.

When a powder layer is formed, the first recoater roller 14 that arrives at the fabrication chamber 22 relatively early is disposed at a position higher than the second recoater roller 15 that arrives as the fabrication chamber 22 relatively later.

In addition, when a powder layer is formed, the first recoater roller 14 rotates forward (in a direction indicated by arrow R1 in FIG. 11B) and the second recoater roller 15 rotates in reverse (in a direction indicated by arrow R2 in FIG. 11B) with respect to a moving direction (indicated by arrow X3 in FIG. 11B) of the first recoater roller 14 and the second recoater roller 15.

Accordingly, as illustrated in FIG. 11A, when the powder 20 transferred to the fabrication chamber 22 is flattened with the first recoater roller 14 and the second recoater roller 15 to form a powder layer, as illustrated in FIG. 11B, first, the first recoater roller 14 rotating forward in the moving direction X3 arrives at the powder 20 in advance of the second recoater roller 15 to form a high-density powder layer. Next, only the upper portion of the high-density powder layer is removed with the second recoater roller 15 rotating in reverse with respect to the moving direction X3, thus allowing a powder layer to be formed at a desired thickness and a high degree of surface flatness (of a surface onto which fabrication liquid is discharged).

In other words, when a powder layer is formed with a single flattening roller, the powder layer can be formed at a relatively high degree of accuracy in flat surface. However, it may be relatively difficult to form the powder layer at a high density, and a powder layer formed on which an already-solidified fabrication layer is not uniform in density to a powder layer formed on a powder layer having no fabrication layer.

Consequently, when clumps of powder not solidified are formed due to the shape of three-dimensional data, an area having such clumps decreases in density, thus reducing the hardness and accuracy of a fabrication layer formed on the area.

Hence, according to this embodiment, the first recoater roller 14 presses the powder 20 to obtain a powder layer of a relatively high density, and the second recoater roller 15 removes only an upper portion of the relatively-high density layer of the powder 20 to obtain the powder layer of the high density and a high flatness.

Figure 12:
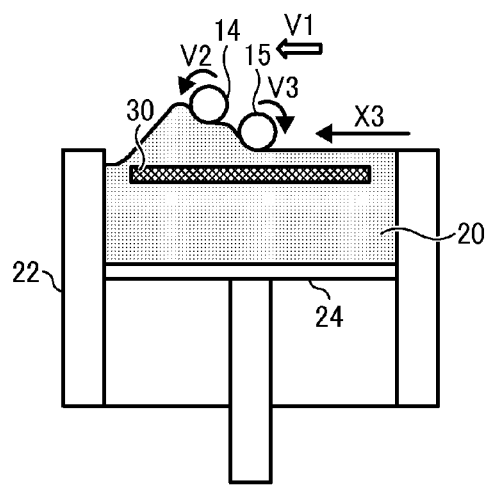
FIG. 12 is an illustration of drive conditions of recoater rollers in a seventh embodiment of this disclosure.

Next, a seventh exemplary embodiment of this disclosure is described with reference to FIG. 12. FIG. 12 is an illustration of drive conditions of recoater rollers in the seventh embodiment.

In formation of a powder layer, the number of rotation per unit time is set so that a relative moving speed V1 of a first recoater roller 14 relative to a fabrication stage 24 and a peripheral speed V2 of the first recoater roller 14 in rotation satisfies a relation of V1<V2.

Such a configuration allows the first recoater roller 14 to move while drawing powder 20 downward at an upstream side in a moving direction indicated by arrow X3 thereof, thus increasing the density of the powder layer in a fabrication chamber 22.

In such a case, if a configuration of forming the surface of the powder layer with a blade is employed, there is a limitation in increasing a relative speed difference between the blade and the surface of the powder layer formed and it would be difficult to form the surface of the powder layer at a high accuracy of flatness.

By contrast, according to this embodiment, the relative speed between the powder 20 and the surface of the second recoater roller 15 is determined by the moving speed of the second recoater roller 15 and a rotation speed V3 of the second recoater roller 15.

Hence, in this embodiment, by setting the rotation speed V3 of the second recoater roller 15 to a relatively large speed, the relative speed between the powder 20 and the surface of the second recoater roller 15 can be increased, thus allowing the surface of the powder layer to be formed at a high accuracy of flatness.

Figure 13:
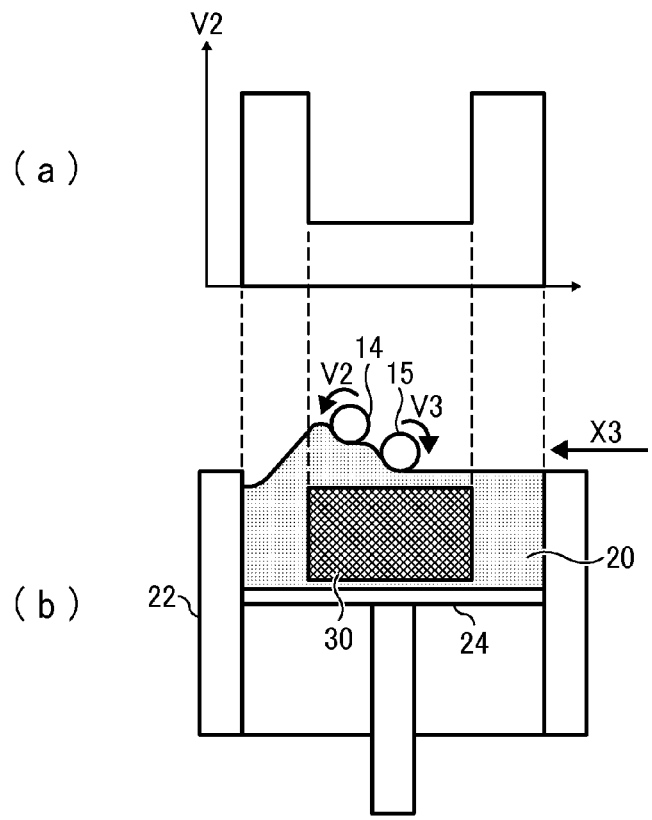
FIG. 13 is an illustration of drive conditions of recoater rollers in an eighth embodiment of this disclosure.
Figure 14A:
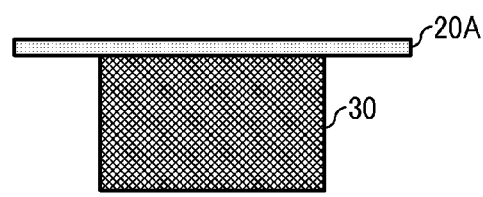
FIGS. 14A and 14B are illustrations of three-dimensional data patterns and non-fabricated regions.
Figure 14B:
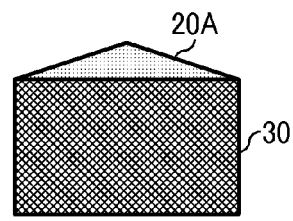

Next, an eighth embodiment of the present disclosure is described with reference to FIGS. 13, 14A, and 14B. FIG. 13 is an illustration of drive conditions of recoater rollers in the eighth embodiment. FIGS. 14A and 14B are illustrations of three-dimensional data patterns and non-fabricated region.

In this embodiment, based on three-dimensional data pattern, the number of rotation per unit time (peripheral speed V2) of the first recoater roller 14 is changed in accordance with the cross-sectional shape of a fabrication layer to be formed, and the position of the first recoater roller 14 in a direction indicated by arrow X3 (the position in a moving direction and/or a positional relation (relative positions) of a fabrication stage 24 and the first recoater roller 14).

In other words, even if the pressure of the first recoater roller 14 is reduced on a region in which the fabrication layer 30 is formed, the powder layer is formed at a relatively high density.

Hence, as illustrated in FIG. 13, a powder layer is formed at a reduced number (reduced rotation speed V2) of rotation per unit time of the first recoater roller 14. By contrast, in an area in which a region having no fabrication layer 30 continues in the height direction, the powder layer is formed at an increased number of rotation per unit time (increased rotation speed V2) of the first recoater roller 14.

Such a configuration suppresses consumed power and occurrence of noise during operation of the three-dimensional fabricating apparatus.

In such a case, at points in which the number of rotation per unit time of the first recoater roller 14 is changed, the surface of the powder 20 may be uneven. However, since the second recoater roller 15 forms the surface of the powder layer at a constant number of rotation per unit time, a high degree of accuracy in surface flatness can be obtained.

When a non-fabricated region 20A is present on a non-solidified region of the fabrication layer 30 as in a three-dimensional data pattern illustrated in FIG. 14A, the number of rotation per unit time (rotation speed V2) of the first recoater roller 14 is changed.

Alternatively, when a non-fabricated region 20A is absent on a non-solidified region of the fabrication layer 30 as in a three-dimensional data pattern illustrated in FIG. 14B, the non-fabricated region 20A does not affect the accuracy and hardness of a final fabrication object. Accordingly, the number of rotation per unit time (rotation speed V2) of the first recoater roller 14 is not changed.

Such a configuration suppresses consumed power and occurrence of noise during operation of the three-dimensional fabricating apparatus.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An apparatus for fabricating a three-dimensional object, the apparatus comprising:
   a supply chamber to supply powder for fabrication of the three-dimensional object;
   a fabrication stage on which a fabrication layer in which powder particles are bound together is formed layer-by-layer;
   a flattener including a transfer roller to transfer powder from a top portion of the supply chamber to a top portion of the fabrication stage; and
   a controller to control and cause the flattener to move relatively in a horizontal moving direction from above the supply chamber to above the fabrication stage, the fabrication stage being disposed downstream in the horizontal moving direction from the supply chamber,
   wherein as the flattener moves in the horizontal moving direction from the supply chamber to the fabrication stage, the controller causes the transfer roller to rotate in a counter-rotation direction counter to the horizontal moving direction, to transfer the powder from the supply chamber to the fabrication stage, and as the flattener moves in the horizontal moving direction along a stage surface of the fabrication stage, the controller causes the transfer roller to rotate in a forward rotation direction opposite to the counter-rotation direction, to flatten a surface of powder on the fabrication stage to form a powder layer,
   wherein the controller controls the fabrication stage and the flattener to be relatively movable in a height direction, and
   in formation of the powder layer on the fabrication layer formed on the fabrication stage, the controller (a) controls the flattener to be moved to a position near an edge of the fabrication layer, and then (b) controls the flattener to be elevated to increase a distance between the flattener and the stationary fabrication stage in the height direction, and then (c) controls the flattener to be moved in the moving direction, parallel to the surface of the fabrication stage.

2. The apparatus according to claim 1, wherein the controller controls operation of a leveling action to move the flattener in the moving direction with the distance being increased, to level down an upheaval of the powder formed upstream from the flattener in the moving direction.

3. The apparatus according to claim 2, wherein, when a number of layers or thickness of the fabrication layer is greater than a threshold value, the controller causes the apparatus to perform the operation a reduced number of times or does not perform the operation.

4. The apparatus according to claim 2, wherein, when a distance between an edge of the fabrication layer and an edge of the fabrication stage in the moving direction of the flattener is greater than a threshold value, the controller causes the apparatus to perform the operation a reduced number of times or does not perform the operation.

5. The apparatus according to claim 2, wherein a number of times of the operation to be performed is changeable according to a shape of the fabrication layer formed on the fabrication stage.

6. An apparatus for fabricating a three-dimensional object, the apparatus comprising:
   a fabrication stage on which a fabrication layer in which powder particles are bound together is formed layer-by-layer;
   a flattener; and
   a controller to control and cause the flattener to move relatively in a moving direction along a stage surface of the fabrication stage and flatten a surface of powder on the fabrication stage to form a powder layer,
   the flattener including a first flattening roller and a second flattening roller,
   wherein, in formation of the powder layer, (i) the first flattening roller is disposed on a downstream side, in the moving direction, relative to where the second flattening roller is placed, (ii) the first flattening roller is disposed at a position higher than the second flattening roller in a vertical direction perpendicular to the moving direction, (iii) the controller controls the first flattening roller to rotate forward in a relative moving direction with respect to the fabrication stage, and (iv) the controller controls the second flattening roller to rotate in reverse in a relative moving direction with respect to the fabrication stage.

7. The apparatus according to claim 6, wherein a peripheral speed of the first flattening roller is controlled by the controller to be not less than a relative moving speed of the fabrication stage and the first flattening roller.

8. The apparatus according to claim 6, wherein a peripheral speed of the first flattening roller is changeable by control by the controller according to at least one of a cross-sectional shape of the fabrication layer and a positional relation of the fabrication stage and the first flattening roller.

* * * * *